United States Patent
Kuo (10) Patent No.: US 9,769,676 B2
(45) Date of Patent: Sep. 19, 2017

(54) METHOD OF HANDLING BEAMFORMING FEEDBACK IN A WIRELESS COMMUNICATION SYSTEM AND RELATED COMMUNICATION DEVICE

(71) Applicant: Industrial Technology Research Institute, Hsinchu (TW)

(72) Inventor: Ping-Heng Kuo, New Taipei (TW)

(73) Assignee: Industrial Technology Research Institute, Hsinchu (TW)

(*) Notice: Subject to any disclaimer, the term of this patent is extended or adjusted under 35 U.S.C. 154(b) by 181 days.

(21) Appl. No.: 14/052,779

(22) Filed: Oct. 14, 2013

(65) Prior Publication Data

US 2014/0113669 A1 Apr. 24, 2014

Related U.S. Application Data

(60) Provisional application No. 61/715,848, filed on Oct. 19, 2012.

(51) Int. Cl.
| | |
|---|---|
| *H04B 15/00* | (2006.01) |
| *H04W 16/28* | (2009.01) |
| *H04B 7/04* | (2017.01) |
| *H04W 24/02* | (2009.01) |
| *H04B 7/06* | (2006.01) |

(52) U.S. Cl.
CPC .......... *H04W 16/28* (2013.01); *H04B 7/0478* (2013.01); *H04B 7/0632* (2013.01); *H04B 7/0639* (2013.01); *H04B 7/0658* (2013.01); *H04W 24/02* (2013.01); *H04B 7/0626* (2013.01)

(58) Field of Classification Search
CPC ..... H04B 7/0626; H04B 7/024; H04B 7/0639
USPC ............................. 455/501, 522, 63.1, 67.13
See application file for complete search history.

(56) References Cited

U.S. PATENT DOCUMENTS

| | | | | |
|---|---|---|---|---|
| 8,891,604 | B2* | 11/2014 | Khojastepour | H04B 7/0456 370/328 |
| 2007/0042720 | A1* | 2/2007 | Pan | H04B 7/0417 455/69 |
| 2008/0316935 | A1* | 12/2008 | Bala | H04B 7/0408 370/252 |
| 2011/0013603 | A1* | 1/2011 | Li | H04B 7/0602 370/338 |

(Continued)

FOREIGN PATENT DOCUMENTS

| | | |
|---|---|---|
| CN | 1893308 A | 1/2007 |
| CN | 101227217 A | 7/2008 |

(Continued)

*Primary Examiner* — Md Talukder
(74) *Attorney, Agent, or Firm* — Winston Hsu (57) ABSTRACT

A method of handling a beamforming feedback for a base station of the wireless communication system comprises receiving a message comprising information of an interference caused by a communication between the base station and a communication device of the wireless communication system; determining an accuracy level of channel information according to the information of the interference; controlling the communication device to transmit the channel information with the accuracy level to the base station; and performing a beamforming according to the channel information to communicate with the communication device, after receiving the channel information transmitted by the communication device.

20 Claims, 6 Drawing Sheets

(56) References Cited

U.S. PATENT DOCUMENTS

| | | | | |
|---|---|---|---|---|
| 2011/0034192 A1* | 2/2011 | Lim | ............... | H04B 7/0417 |
| | | | | 455/501 |
| 2011/0081865 A1* | 4/2011 | Xiao | ............ | H04W 52/243 |
| | | | | 455/63.1 |
| 2011/0237282 A1* | 9/2011 | Geirhofer | ............ | H04B 7/024 |
| | | | | 455/509 |
| 2011/0244847 A1* | 10/2011 | Mallik | ............ | H04B 7/024 |
| | | | | 455/422.1 |
| 2012/0202431 A1* | 8/2012 | Hawryluck | ............ | H04B 7/024 |
| | | | | 455/63.4 |
| 2013/0329594 A1* | 12/2013 | Davydov | ............ | H04B 7/0486 |
| | | | | 370/252 |
| 2014/0113669 A1* | 4/2014 | Kuo | ............... | H04W 16/28 |
| | | | | 455/501 |

FOREIGN PATENT DOCUMENTS

| | | |
|---|---|---|
| CN | 102664668 A | 9/2012 |
| CN | 102687551 A | 9/2012 |
| EP | 2 658 154 A2 | 10/2013 |
| WO | 2012086981 A2 | 6/2012 |
| WO | 2012086981 A3 | 6/2012 |

\* cited by examiner

METHOD OF HANDLING BEAMFORMING FEEDBACK IN A WIRELESS COMMUNICATION SYSTEM AND RELATED COMMUNICATION DEVICE

CROSS REFERENCE TO RELATED APPLICATIONS

This application claims the benefit of U.S. Provisional Application No. 61/715,848, filed on Oct. 19, 2012 and entitled "Beamforming Techniques in Communication Networks", the contents of which are incorporated herein in their entirety.

BACKGROUND OF THE INVENTION

1. Field of the Invention

The present invention relates to a method used in a wireless communication system and related communication device, and more particularly, to a method of handling a beamforming feedback in a wireless communication system and related communication device.

2. Description of the Prior Art

A long-term evolution (LTE) system supporting the 3rd Generation Partnership Project (3GPP) Rel-8 standard and/or the 3GPP Rel-9 standard are developed by the 3GPP as a successor of a universal mobile telecommunications system (UMTS), for further enhancing performance of the UMTS to satisfy increasing needs of users. The LTE system includes a new radio interface and a new radio network architecture that provides a high data rate, low latency, packet optimization, and improved system capacity and coverage. In the LTE system, a radio access network known as an evolved universal terrestrial radio access network (E-UTRAN) includes multiple evolved Node-Bs (eNBs) for communicating with multiple user equipments (UEs), and communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, and includes advanced techniques, such as carrier aggregation (CA), coordinated multipoint (CoMP) transmission/reception, UL multiple-input multiple-output (MIMO), etc. For a UE and an eNB to communicate with each other in the LTE-A system, the UE and the eNB must support standards developed for the LTE-A system, such as the 3GPP Rel-10 standard or later versions.

In addition, it is expected that a beamforming (e.g., 3D-beamforming) realized at the eNB can be further improved to enhance throughput of the eNB. For example, the UE can feedback channel information which is accurate enough to the eNB, such that the eNB can realize the beamforming with a high accuracy according to the channel information. However, a large amount of overhead is needed for feeding back the channel information with a high accuracy or a high precision. Not only power consumption of the UE is increased, but throughput of the UE is decreased.

Thus, feeding back the channel information efficiently is important problem to be solved, to realize the beamforming in practice.

SUMMARY OF THE INVENTION

The present invention therefore provides a method and related communication device for handling a beamforming feedback in a wireless communication system to solve the abovementioned problem.

A method of handling a beamforming feedback for a base station of the wireless communication system comprises receiving a message comprising information of an interference caused by a communication between the base station and a communication device of the wireless communication system; determining an accuracy level of channel information according to the information of the interference; controlling the communication device to transmit the channel information with the accuracy level to the base station; and performing a beamforming according to the channel information to communicate with the communication device, after receiving the channel information transmitted by the communication device.

A method of handling a beamforming feedback for a base station of the wireless communication system comprises receiving a message comprising information of an interference caused by a communication between the base station and a communication device of the wireless communication system; determining a number of a plurality of transmit antennas for performing a beamforming according to the information of the interference; controlling the communication device to transmit channel information corresponding to the plurality of transmit antennas to the base station; and performing the beamforming with the plurality of transmit antennas according to the channel information to communicate with the communication device, after receiving the channel information transmitted by the communication device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
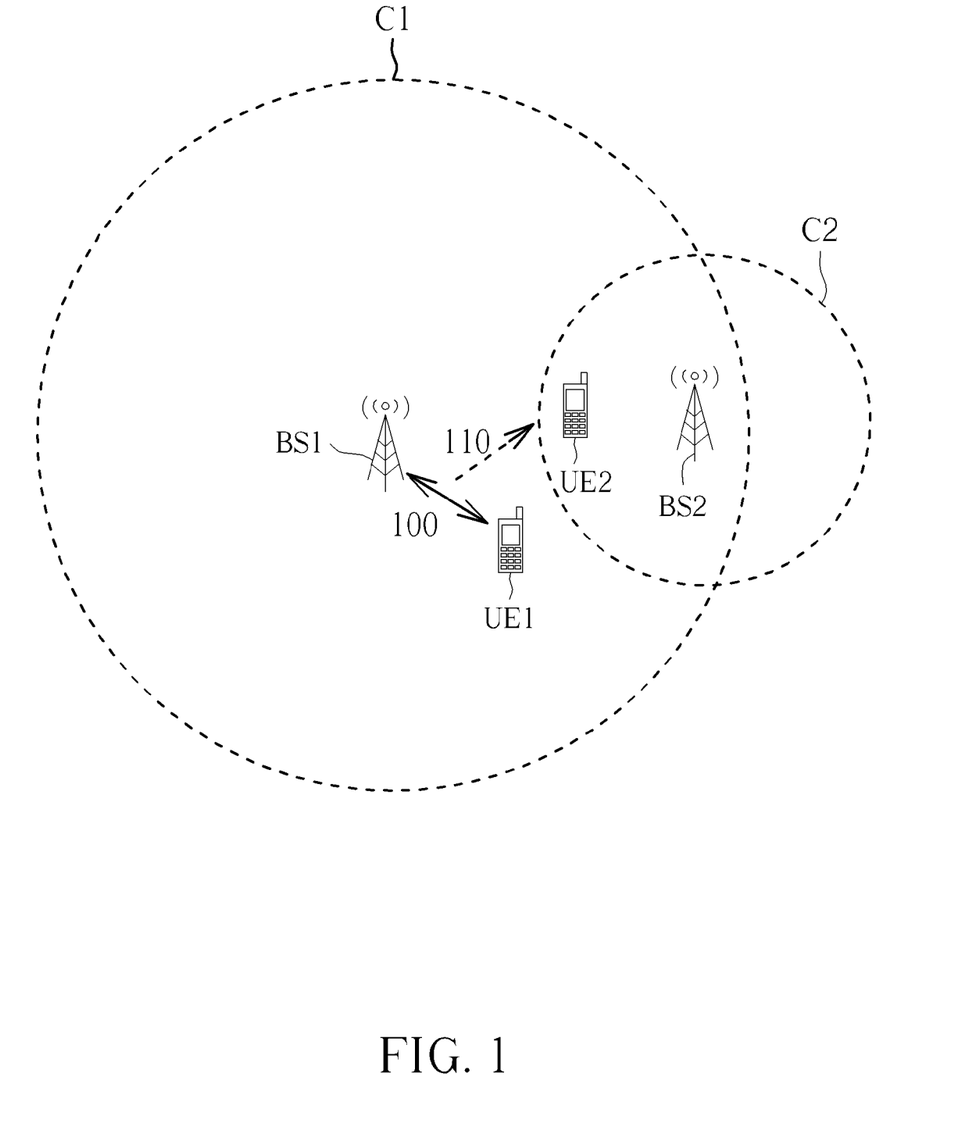
FIG. 1 is a schematic diagram of a wireless communication system according to an example of the present invention.

Please refer to FIG. 1, which is a schematic diagram of a wireless communication system 10 according to an example of the present invention. The wireless communication system 20 is briefly composed of two base stations (BSs) BS1-BS2 and two user equipments (UEs) UE1-UE2. The BS BS1 may be seen as a serving base station of the UE UE1. The BS BS2 may be seen as a neighboring base station of the UE UE1 and a serving base station of the UE UE2. Coverage areas of the BSs BS1-BS2 can be seen as two different cells C1-C2, respectively. The UEs UE1-UE2 are in the cells C1-C2, respectively, as shown in FIG. 1. In FIG. 1, the cells C1-C2 are partly overlapped, the cell C2 is smaller than the cell C1, and the BS BS2 is within the cell C1. That is, the BS BS2 may be seen as a small-cell BS (or a micro-cell BS)

within the coverage area of the BS BS1 which may be seen as a macro-cell BS. In another example, the cells C1-C2 can be nonoverlapped, and are not limited. In addition, a communication 100 occurs between the BS BS1 and the UE UE1, and causes an interference 110 to the BS BS2 and/or the UE UE2. The interference 110 is especially severe for the UE2, when the UE UE2 is at a boundary of the cell C2 and/or near the BS BS1 or the UE UE1.

In FIG. 1, the BSs BS1-BS2 and the UEs UE1-UE2 are simply utilized for illustrating the structure of the wireless communication system 10. For example, the BSs BS1-BS2 and the UEs UE1-UE2 may support the 3rd Generation Partnership Project (3GPP) Rel-11 standard or later versions. In detail, a BS maybe a Node-B (NB) in universal terrestrial radio access network (UTRAN) of a universal mobile telecommunications system (UMTS). In another example, the BS may be an evolved NB (eNB) or a relay in an evolved UTRAN (E-UTRAN) of a long term evolution (LTE) system, a LTE-Advanced (LTE-A) system or an evolution of the LTE-A system. A UE can be a mobile phone, a laptop, a tablet computer, an electronic book or a portable computer system but is not limited. In addition, a BS and a UE can be seen as a transmitter or a receiver according to a direction of transmission/reception, e.g., for an UL, the UE is the transmitter and the BS is the receiver, and for a DL, the BS is the transmitter and the UE is the receiver. More specifically, for the BS, the direction of the transmission is DL, and the direction of the reception is UL. For the UE, the direction of the transmission is UL, and the direction of the reception is DL.

Figure 2:
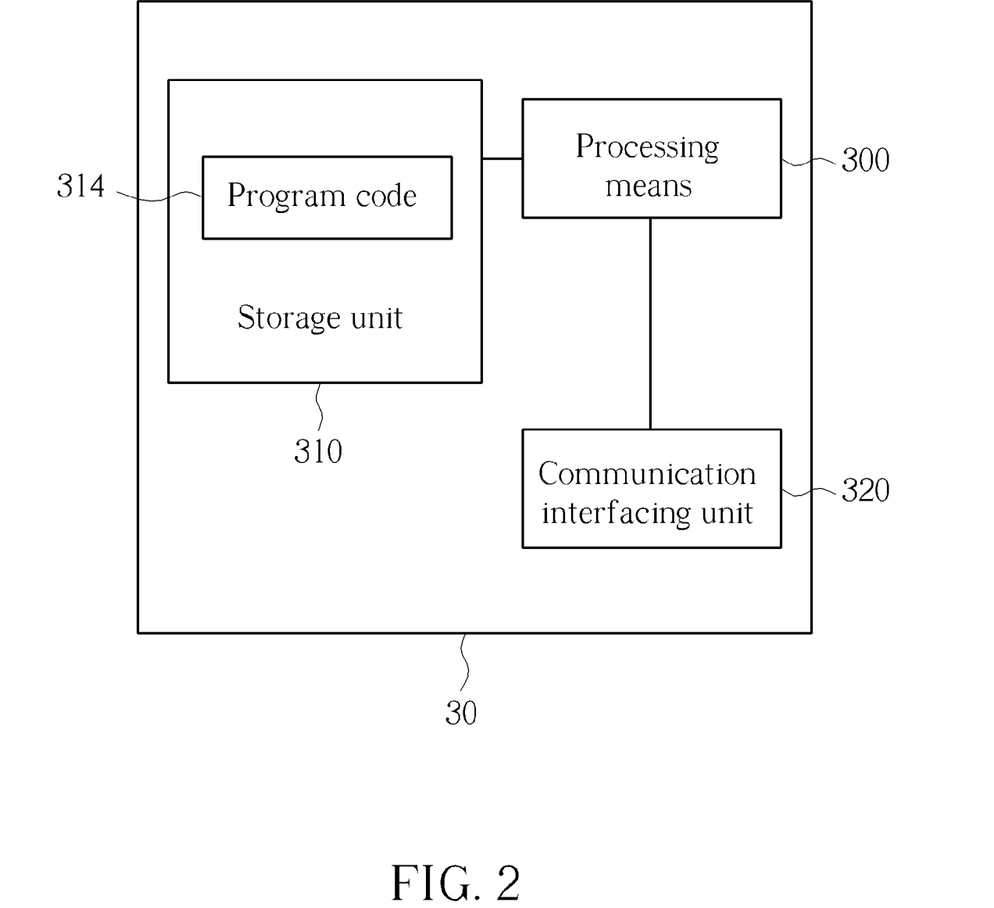
FIG. 2 is a schematic diagram of a communication device according to an example of the present invention.

Please refer to FIG. 2, which is a schematic diagram of a communication device 20 according to an example of the present invention. The communication device 20 can be a UE (e.g., the UE UE1 or UE2) or a BS (e.g., the BS BS1 or BS2) shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that can store a program code 214, accessed and executed by the processing means 200. Examples of the storage unit 210 include but are not limited to a subscriber identity module (SIM), read-only memory (ROM), flash memory, random-access memory (RAM), CD-ROM/DVD-ROM, magnetic tape, hard disk and optical data storage device. The communication interfacing unit 220 is preferably a transceiver and is used to transmit and receive signals (e.g., messages or packets) according to processing results of the processing means 200.

Figure 3:
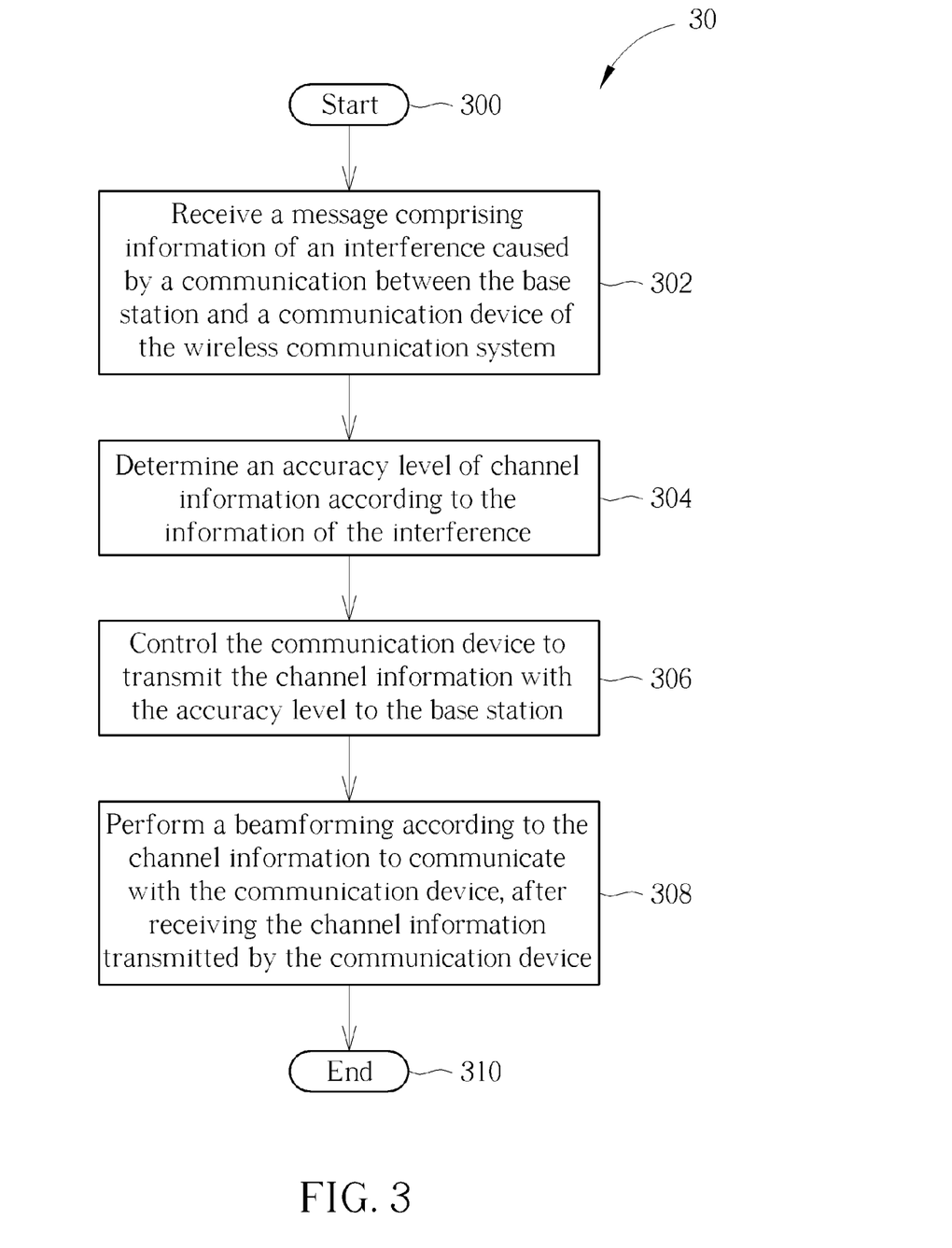
FIG. 3 is a flowchart of a process according to an example of the present invention.

Please refer to FIG. 3, which is a flowchart of a process 30 according to an example of the present invention. The process 30 is utilized in a base station, for handling a beamforming feedback. The process 30 may be compiled into the program code 214 and includes the following steps:

Step 300: Start.

Step 302: Receive a message comprising information of an interference caused by a communication between the base station and a communication device of the wireless communication system.

Step 304: Determine an accuracy level of channel information according to the information of the interference.

Step 306: Control the communication device to transmit the channel information with the accuracy level to the base station.

Step 308: Perform a beamforming according to the channel information to communicate with the communication device, after receiving the channel information transmitted by the communication device.

Step 310: End.

According to the process 30, the base station (e.g., the BS BS1) receives a message comprising information of an interference (e.g., the interference 110) caused by a communication (e.g., the communication 100) between the base station and a communication device (e.g., the UE UE1) of the wireless communication system. The base station determines an accuracy level of channel information according to the information of the interference, and controls the communication device to transmit the channel information with the accuracy level to the base station. For example, the channel information may include a quality (e.g., channel quality indicator (CQI)) of a channel between the base station and the communication device. Then, the base station performs a beamforming according to the channel information to communicate with (e.g., perform one or more data transmissions to) the communication device, after receiving the channel information transmitted by the communication device. In general, a high accuracy level introduces a large amount of the channel information (e.g., more bits are used by the communication device for transmitting the channel information), and a low accuracy level introduces a small amount of the channel information (e.g., less bits are used by the communication device for transmitting the channel information). Thus, the channel information is fed back efficiently without introducing unnecessary overhead. As a result, power consumption of the communication device is saved.

Taking the wireless communication system 10 as an example, the BS BS1 may change (e.g., reduce) the accuracy level of the channel information according to the information of the interference 110. For example, the BS BS1 may determine a high accuracy level, if the information of the interference 110 indicates that the interference 110 is large. The UE UE1 will feed back the channel information with the high accuracy level to the BS BS1. Then, the BS BS1 can perform the beamforming with a high precision by using the channel information, to reduce more interference. In another example, the BS BS1 may determine a low accuracy level, if the information of the interference 110 does not indicate that the interference 110 is large, e.g., indicates that the interference 110 is small. The UE UE1 will feed back the channel information with the low accuracy level to the BS BS1. Then, the BS BS1 can perform the beamforming by using the channel information, to reduce the interference. In another example, the BS BS1 may determine an accuracy level by selecting a codebook with a specific size. In detail, the BS BS1 may select a codebook with a large size (e.g., a codebook with 256 entries, which implies a feedback overhead of 8 bits) for a high accuracy level, select a codebook with a moderate size (e.g., a codebook with 64 entries, which implies a feedback overhead of 6 bits) for a moderate accuracy level, and select a codebook with a small size (e.g. , a codebook with 16 entries, which implies a feedback overhead of 4 bits) for a low accuracy level.

Realization of the present invention is not limited to the above description. In the following, examples are described according to the wireless communication system 10.

Content of the information of the channel information is not limited. For example, the information may include a severity of the interference 110. The message in the process 30 may be transmitted by another base station of the wireless communication system (e.g., the BS BS2), or is transmitted by another communication device in a coverage area of the another base station (e.g., the UE UE2). In general, the BS BS2 may transmit the message to the BS BS1 via a backhaul (e.g., a fiber link).

In addition, the BS BS1 may further determine the accuracy level of the channel information according to a traffic load of the BS BS1, a carrier frequency of the BS BS1, a channel quality between the BS BS1 and the UE UE1, a battery status of the UE UE1, a service type of the UE UE1 and/or a mobility level of the UE UE1. That is, the BS BS1 may determine the accuracy level of the channel information according to the information of the interference 110 and a combination of the abovementioned parameters, i.e., parameters related to the cell C1 (i.e., serving cell). In another example, the BS BS1 may further determine the accuracy level of the channel information according to a traffic load of the BS BS2, a carrier frequency of the BS BS2, a channel quality between the BS BS2 and the UE UE2, a battery status of the UE UE2, a service type of the UE UE2 and/or a mobility level of the UE UE2. That is, the BS BS1 may determine the accuracy level of the channel information according to the information of the interference 110 and a combination of the abovementioned parameters, i.e., parameters related to the cell C2 (i.e., neighboring cell). In another example, the BS BS1 may determine the accuracy level of the channel information according to the information of the interference 110 and a combination of the parameters of the serving cell and/or the neighboring cell.

A method according to which the BS BS1 controls the UE UE1 to transmit the channel information to the BS BS1 is not limited. For example, the BS BS1 may transmit the accuracy level of the channel information to the UE UE1, such that the UE UE1 may transmit the channel information with the accuracy level to the BS BS1. That is, the BS BS1 explicitly indicates the accuracy level to the UE UE1. In another example, the BS BS1 may determine a reference signal configuration (e.g., density and/or pattern) according to the accuracy level, and generates a reference signal according to the reference signal configuration. Then, the BS BS1 transmits the reference signal to the UE UE1, such that the UE UE1 may obtain the channel information with the accuracy level according to the reference signal and transmit the channel information with the accuracy level to the BS BS1. In other words, the BS BS1 implicitly indicates the accuracy level to the UE UE1 by using the reference signal. The UE UE1 obtains the channel information with the accuracy level, when using the reference signal to obtain the channel information.

Figure 4:
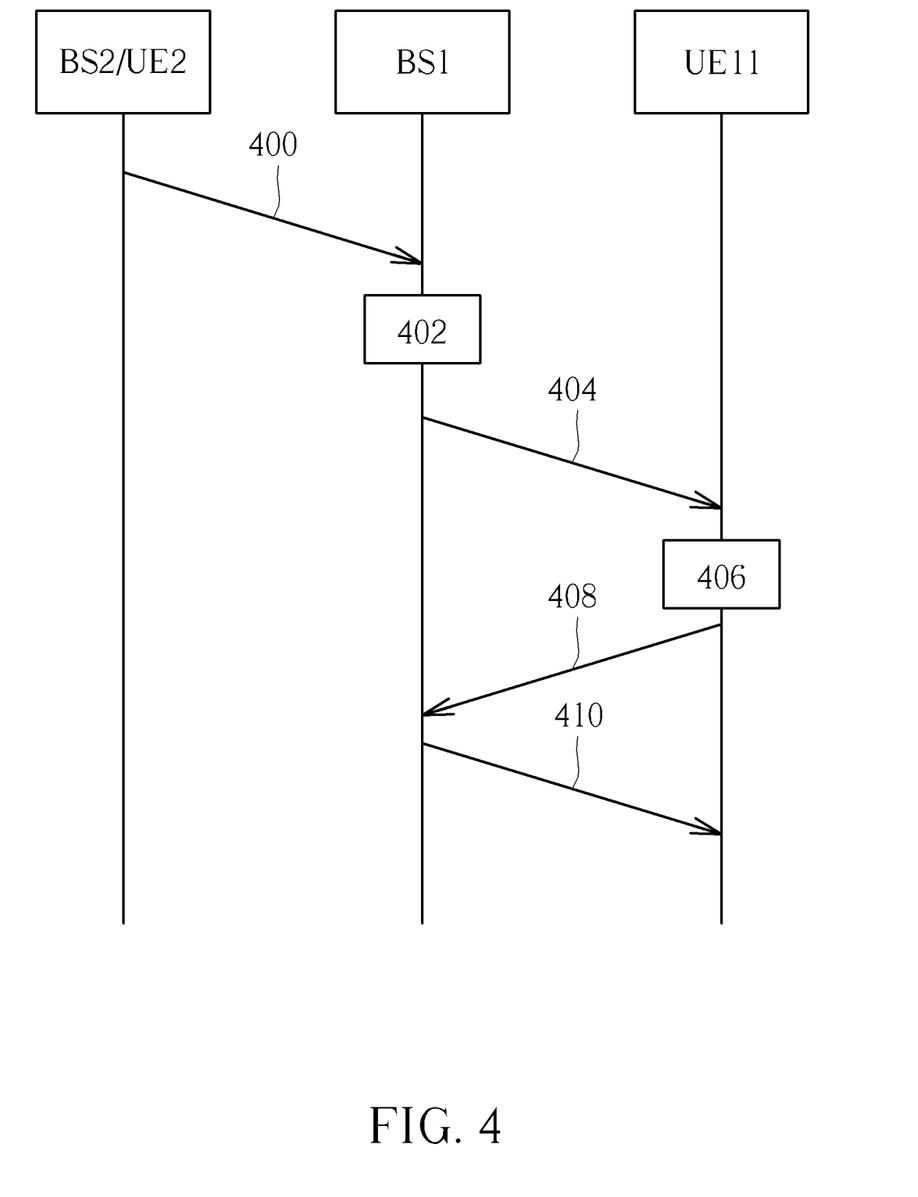
FIG. 4 is a flowchart of a process according to an example of the present invention.

According to the above description, operations of the wireless communication system 10 in FIG. 1 can be summarized into a process 40 as shown in FIG. 4. The process 40 includes the following steps:

Step 400: The BS BS1 or the UE UE1 transmits a message comprising information of an interference caused by a communication between the BS BS1 and the UE UE1.

Step 402: The BS BS1 determines an accuracy level of channel information according to the information of the interference.

Step 404: The BS BS1 controls the UE UE1 to transmit the channel information with the accuracy level to the BS BS1.

Step 406: The UE UE1 obtains the channel information with the accuracy level.

Step 408: The UE UE1 transmits the channel information to the BS BS1.

Step 410: The BS BS1 performs a beamforming according to the channel information to communicate with the UE UE1.

Detailed operations and variations of the process 40 can be referred to the above illustration, and are not narrated herein.

Please note that, the above descriptions and examples can be applied to any resource. That is, the interference mentioned above may correspond to a resource, e.g., the resource is affected by the interference. For example, the BS BS1 determines an accuracy level of channel information of the resource according to information of the interference, and controls the UE UE1 to transmit the channel information of the resource with the accuracy level to the BS BS1. Then, the BS BS1 performs a beamforming according to the channel information to communicate with the UE UE1 via the resource, after receiving the channel information transmitted by the UE UE1. The resource may be identified by a subband, a signaling time interval, a component carrier and/or a transmission point, and is not limited herein.

Figure 5:
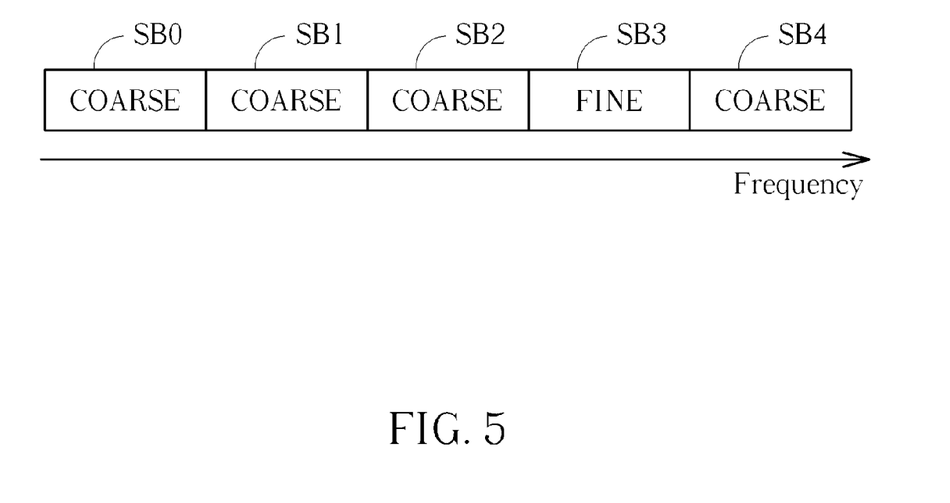
FIG. 5 is a schematic diagram of binary accuracy levels for multiple subbands according to an example of the present invention.

The above example can be applied to each of multiple resources repeatedly, when the resources are considered. Please refer to FIG. 5, which is a schematic diagram of binary accuracy levels for multiple subbands according to an example of the present invention. As shown in FIG. 5, 5 subbands SB0-SB4 are considered. Accuracy levels of the subbands SB0-SB4 have been determined by the BS BS1 according to information of channel information of the subbands SB0-SB4, and are shown in respective subbands. Two accuracy levels including "COARSE" and "FINE" are considered in the present example. For example, the information of the channel information may indicate that the interference corresponding to (e.g., affecting) the subband SB3 caused to the cell C2 (e.g., the BS BS2 and/or the UE UE2) is large (e.g., higher than a certain threshold level). The UE UE1 transmits the channel information with a high accuracy level "FINE" for the subband SB3 to the BS BS1, when the BS BS1 indicates (e.g., explicitly or implicitly) that the channel information of the subband SB3 is "FINE" to the UE UE1. Thus, the interference affecting the subband SUB3 caused to the cell C2 can be reduced. In another example, the information of the channel information may indicate that the interferences corresponding to (e.g., affecting) the subbands SB0-SB2 and SB4 caused to the cell C2 (e.g., the BS BS2 and/or the UE UE2) are not large (e.g., lower than a certain threshold level). The UE UE1 transmits the channel information with a low accuracy level "COARSE" for the subbands SB0-SB2 and SB4 to the BS BS1, when the BS BS1 indicates (e.g., explicitly or implicitly) that the channel information of the subbands SB0-SB2 and SB4 is "COARSE" to the UE UE1.

Figure 6:
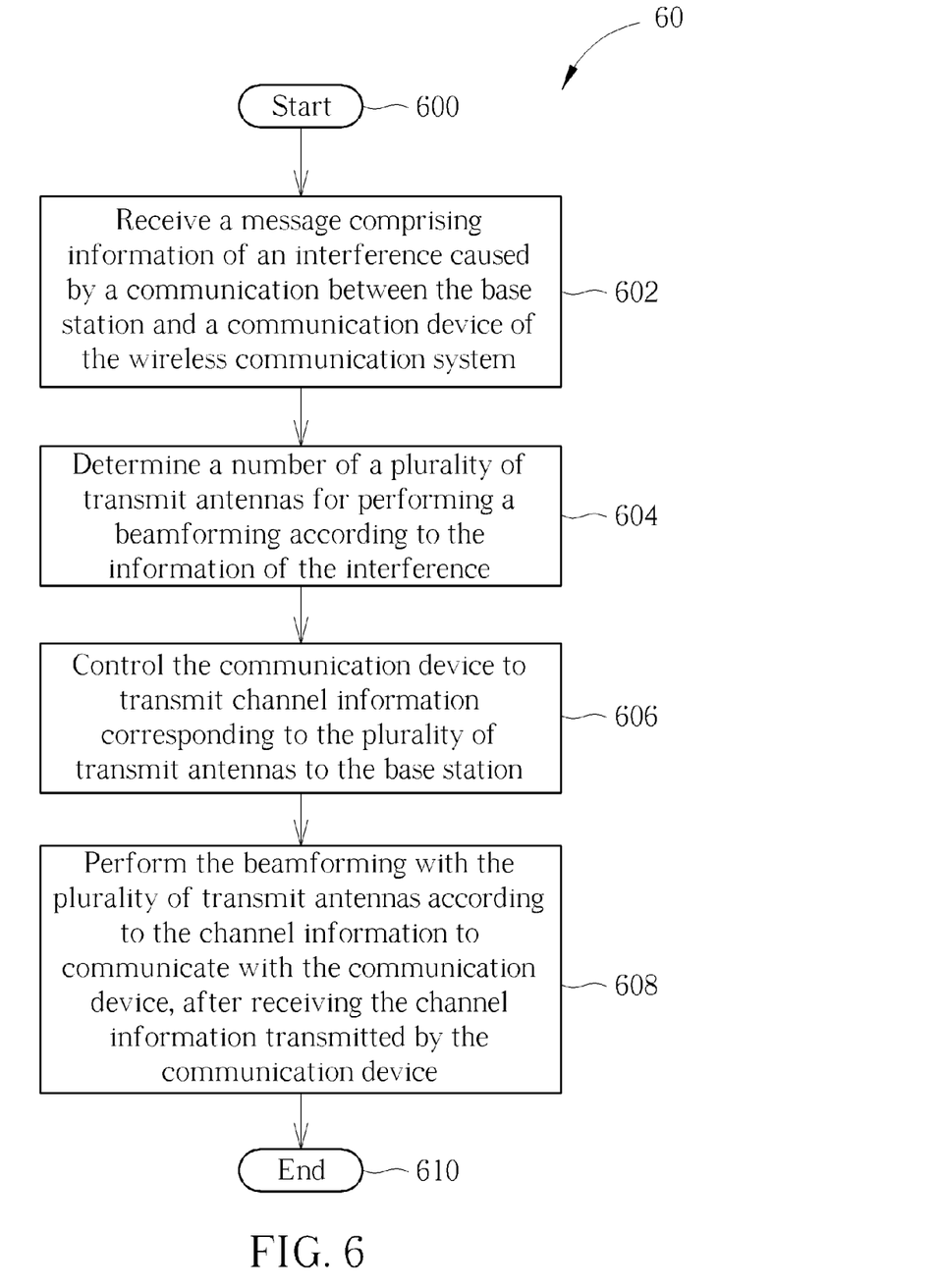
FIG. 6 is a flowchart of a process according to an example of the present invention.

Please refer to FIG. 6, which is a flowchart of a process 60 according to an example of the present invention. The process 60 is utilized in a base station, for handling a beamforming feedback. The process 60 may be compiled into the program code 214 and includes the following steps:

Step 600: Start.

Step 602: Receive a message comprising information of an interference caused by a communication between the base station and a communication device of the wireless communication system.

Step 604: Determine a number of a plurality of transmit antennas for performing a beamforming according to the information of the interference.

Step 606: Control the communication device to transmit channel information corresponding to the plurality of transmit antennas to the base station.

Step 608: Perform the beamforming with the plurality of transmit antennas according to the channel information to communicate with the communication device, after receiving the channel information transmitted by the communication device.

Step 610: End.

According to the process 30, the base station (e.g., the BS BS1) receives a message comprising information of an interference (e.g., the interference 110) caused by a communication (e.g., the communication 100) between the base station and a communication device (e.g., the UE UE1) of the wireless communication system. The base station determines a number of a plurality of transmit antennas for performing a beamforming according to the information of the interference, and controls the communication device to transmit channel information corresponding to the plurality of transmit antennas to the base station. For example, the channel information may include a quality (e.g., CQI) of a channel between the base station and the communication device. Then, the base station performs the beamforming with the plurality of transmit antennas according to the channel information to communicate with the communication device, after receiving the channel information transmitted by the communication device. In general, a large number of transmit antennas introduces a large amount of the channel information, and a small number of transmit antennas introduces a small amount of the channel information. In addition, a large number of transmit antennas introduces a less amount of interference to neighboring cells, and a small number of transmit antennas introduces a large amount of interference to neighboring cells. Thus, the channel information is fed back efficiently without introducing unnecessary overhead. As a result, power consumption of the communication device is saved.

Taking the wireless communication system 10 as an example, the BS BS1 may change (e.g., reduce or increase) the number of the transmit antennas for performing the beamforming according to the information of the interference 110. For example, the BS BS1 may determine a large number of transmit antennas (i.e., a large transmit antenna array), if the information of the interference 110 indicates that the interference 110 is large. The UE UE1 will feed back the channel information corresponding to the large number of transmit antennas to the BS BS1. Then, the BS BS1 can perform the beamforming by using the channel information, to reduce more interference, since a narrow beam can be formed by using the large number of transmit antennas. In another example, the BS BS1 may determine a small number of transmit antennas (i.e., a small transmit antenna array), if the information of the interference 110 does not indicate that the interference 110 is large, e.g., indicates that the interference 110 is small. The UE UE1 will feed back the channel information corresponding to the small number of transmit antennas to the BS BS1. Then, the BS BS1 can perform the beamforming by using the channel information, to reduce the interference, since a wide beam can be formed by using the small number of transmit antennas.

Realization of the present invention is not limited to the above description. In the following, examples are described according to the wireless communication system 10.

The plurality of transmit antennas for performing the beamforming may be a subset of available transmit antennas of the BS BS1. That is, not all of the available transmit antennas are needed for performing the beamforming. Thus, overhead for transmitting the channel information corresponding transmit antennas not being used can be saved. Content of the information of the channel information is not limited. For example, the information may include a severity of the interference 110. The message in the process 60 may be transmitted by another base station of the wireless communication system (e.g., the BS BS2), or is transmitted by another communication device in a coverage area of the another base station (e.g., the UE UE2). In general, the BS BS2 may transmit the message to the BS BS1 via a backhaul (e.g., a fiber link).

In addition, the BS BS1 may further determine the number of the plurality of transmit antennas according to a traffic load of the BS BS1, a carrier frequency of the BS BS1, a channel quality between the BS BS1 and the UE UE1, a battery status of the UE UE1, a service type of the UE UE1 and/or a mobility level of the UE UE1. That is, the BS BS1 may determine the number of the plurality of transmit antennas according to the information of the interference 110 and a combination of the abovementioned parameters, i.e., parameters related to the cell C1 (i.e., serving cell). In another example, the BS BS1 may further determine the number of the plurality of transmit antennas according to a traffic load of the BS BS2, a carrier frequency of the BS BS2, a channel quality between the BS BS2 and the UE UE2, a battery status of the UE UE2, a service type of the UE UE2 and/or a mobility level of the UE UE2. That is, the BS BS1 may determine the number of the plurality of transmit antennas according to the information of the interference 110 and a combination of the abovementioned parameters, i.e., parameters related to the cell C2 (i.e., neighboring cell). In another example, the BS BS1 may determine the number of the plurality of transmit antennas according to the information of the interference 110 and a combination of the parameters of the serving cell and/or the neighboring cell.

Those skilled in the art should readily make combinations, modifications and/or alterations on the abovementioned description and examples. The abovementioned steps of the processes including suggested steps can be realized by means that could be a hardware, a firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include a system on chip (SOC), system in package (SiP), a computer on module (COM), and the communication device 20.

To sum up, the present invention provides a method for handling a beamforming feedback in a wireless communication system. Since an amount of channel information can be adjusted according to information of an interference caused to one or more neighboring cells, the channel information is fed back efficiently without introducing unnecessary overhead. As a result, power consumption of a communication device feeding back the channel information is saved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling a beamforming feedback for a base station of a wireless communication system, the method comprising:
receiving a message comprising information of an interference caused by a communication between the base station and a communication device of the wireless communication system;

determining an accuracy level of channel information according to the information of the interference;

controlling the communication device to transmit the channel information with the accuracy level to the base station; and performing a beamforming according to the channel information to communicate with the communication device, after receiving the channel information transmitted by the communication device.

2. The method of claim 1, wherein the information comprises a severity of the interference.

3. The method of claim 1, wherein the accuracy level of the channel information is related to an amount of bits used by the communication device for transmitting the channel information.

4. The method of claim 1, wherein the base station further determines the accuracy level according to a traffic load of the base station, a carrier frequency of the base station, a channel quality between the base station and the communication device, a battery status of the communication device, a service type of the communication device and/or a mobility level of the communication device.

5. The method of claim 1, wherein the message is transmitted by another base station of the wireless communication system, or is transmitted by another communication device in a coverage area of the another base station.

6. The method of claim 5, wherein a coverage area of the base station overlaps with the coverage area of the another base station.

7. The method of claim 5, wherein the base station is a serving base station of the communication device, and the another base station is a neighboring base station of the communication device.

8. The method of claim 5, wherein the base station further determines the accuracy level according to a traffic load of the another base station, a carrier frequency of the another base station, a channel quality between the another base station and the another communication device, a battery status of the another communication device, a service type of the another communication device and/or a mobility level of the another communication device.

9. The method of claim 1, wherein the step of controlling the communication device to transmit the channel information with the accuracy level to the base station comprises:

transmitting the accuracy level of the channel information to the communication device, for the communication device to transmit the channel information with the accuracy level to the base station.

10. The method of claim 1, wherein the step of controlling the communication device to transmit the channel information with the accuracy level to the base station comprises:

determining a reference signal configuration according to the accuracy level;

generating a reference signal according to the reference signal configuration; and transmitting the reference signal to the communication device, for the communication device to obtain the channel information with the accuracy level according to the reference signal and to transmit the channel information to the base station.

11. The method of claim 1, wherein the interference corresponds to a resource and the method comprises:

determining the accuracy level of the channel information of the resource according to the information of the interference;

controlling the communication device to transmit the channel information of the resource with the accuracy level to the base station; and performing a beamforming according to the channel information to communicate with the communication device via the resource, after receiving the channel information transmitted by the communication device.

12. The method of claim 11, wherein the resource is identified by a subband, a signaling time interval, a component carrier and/or a transmission point.

13. A method of handling a beamforming feedback for a base station of a wireless communication system, the method comprising:

receiving a message comprising information of an interference caused by a communication between the base station and a communication device of the wireless communication system;

determining a number of a plurality of transmit antennas for performing a beamforming according to the information of the interference;

controlling the communication device to transmit channel information corresponding to the plurality of transmit antennas to the base station; and performing the beamforming with the plurality of transmit antennas according to the channel information to communicate with the communication device, after receiving the channel information transmitted by the communication device.

14. The method of claim 13, wherein the plurality of transmit antennas is a subset of available transmit antennas of the base station.

15. The method of claim 13, wherein the information comprises a severity of the interference.

16. The method of claim 13, wherein the base station further determines the number of the plurality of transmit antennas according to a traffic load of the base station, a carrier frequency of the base station, a channel quality between the base station and the communication device, a battery status of the communication device, a service type of the communication device and/or a mobility level of the communication device.

17. The method of claim 13, wherein the message is transmitted by another base station of the wireless communication system, or is transmitted by another communication device in a coverage area of the another base station.

18. The method of claim 17, wherein a coverage area of the base station overlaps with the coverage area of the another base station.

19. The method of claim 17, wherein the base station is a serving base station of the communication device, and the another base station is a neighboring base station of the communication device.

20. The method of claim 17, wherein the base station further determines the number of the plurality of transmit antennas according to a traffic load of the another base station, a carrier frequency of the another base station, a channel quality between the another base station and the another communication device, a battery status of the another communication device, a service type of the another communication device and/or a mobility level of the another communication device.

* * * * *